(12) United States Patent
Tofighbakhsh et al.

(10) Patent No.: US 11,108,849 B2
(45) Date of Patent: Aug. 31, 2021

(54) GLOBAL INTERNET OF THINGS (IOT) QUALITY OF SERVICE (QOS) REALIZATION THROUGH COLLABORATIVE EDGE GATEWAYS

(71) Applicants: AT&T INTELLECTUAL PROPERTY I, L.P., Atlanta, GA (US); AT&T INTELLECTUAL PROPERTY II, L.P., Atlanta, GA (US)

(72) Inventors: Mostafa Tofighbakhsh, Cupertino, CA (US); Vinay Kundaje, Allen, TX (US)

(73) Assignees: AT&T INTELLECTUAL PROPERTY I, L.P., Atlanta, GA (US); AT&T INTELLECTUAL PROPERTY II, L.P., Atlanta, GA (US)

( * ) Notice: Subject to any disclaimer, the term of this patent is extended or adjusted under 35 U.S.C. 154(b) by 60 days.

(21) Appl. No.: 16/208,227

(22) Filed: Dec. 3, 2018

(65) Prior Publication Data
US 2020/0177671 A1    Jun. 4, 2020

(51) Int. Cl.
*H04L 29/08* (2006.01)
*H04W 4/029* (2018.01)
*H04W 84/18* (2009.01)

(52) U.S. Cl.
CPC .......... *H04L 67/1002* (2013.01); *H04L 67/12* (2013.01); *H04W 4/029* (2018.02); *H04W 84/18* (2013.01)

(58) Field of Classification Search
CPC .... H04L 67/1002; H04L 67/12; H04W 84/18; H04W 4/029
See application file for complete search history.

(56) References Cited

U.S. PATENT DOCUMENTS 7,839,764 B2    11/2010   Jiang et al.
8,643,495 B2    2/2014    Lan et al.
(Continued)

FOREIGN PATENT DOCUMENTS

| CN | 107172166 A | * | 9/2017 |
| WO | 2018117301 A1 | | 6/2018 |
| WO | 2018206592 | | 11/2018 |

OTHER PUBLICATIONS

Polo et al. "Design of a low-cost Wireless Sensor Network with UAV mobile node for agricultural applications" Computers and electronics in agriculture 119, 2015, 14 pages.
(Continued)

*Primary Examiner* — Uzma Alam
(74) *Attorney, Agent, or Firm* — Amin, Turocy & Watson, LLP

(57) ABSTRACT

Global Internet of things (IoT) quality of service (QoS) is provided through self-forming, self-healing, and/or collaborative edge IoT gateways. Moreover, global IoT services are provided by logically extending cellular networks with roaming partners to backhaul, track, and/or manage the globally deployed edge IoT gateways. In one aspect, real-time QoS and/or monitoring capabilities for the global IoT services can be provided through a communication between the edge IoT gateways and an edge gateway controller deployed within a cloud. The edge IoT gateways form a structured mesh network to coordinate workload execution under control of the edge gateway controller, which can facilitate a highly efficient QoS and/or SLA management for mobile IoT sensors, to provide a secure monitoring and/or diagnostic capability for the global IoT services.

20 Claims, 10 Drawing Sheets

(56) References Cited

U.S. PATENT DOCUMENTS

| | | | |
|---|---|---|---|
| 9,464,902 | B2 | 10/2016 | Isler et al. |
| 9,582,002 | B2 | 2/2017 | Cavender-bares |
| 9,745,060 | B2 | 8/2017 | O'connor et al. |
| 9,776,717 | B2 | 10/2017 | Spinelli et al. |
| 9,860,677 | B1* | 1/2018 | Agerstam ............... H04W 4/70 |
| 9,880,559 | B2 | 1/2018 | Putkonen et al. |
| 9,959,507 | B2 | 5/2018 | Mathur et al. |
| 9,960,933 | B2 | 5/2018 | Ghosh et al. |
| 9,998,320 | B2 | 6/2018 | Fargano et al. |
| 10,069,950 | B2 | 9/2018 | Kotecha et al. |
| 2007/0143043 | A1 | 6/2007 | Wafer et al. |
| 2010/0085903 | A1 | 4/2010 | Pandey et al. |
| 2011/0069612 | A1* | 3/2011 | Yamaguchi ............. H04L 45/22 370/225 |
| 2012/0054527 | A1 | 3/2012 | Pfeifer et al. |
| 2012/0271461 | A1 | 10/2012 | Spata |
| 2014/0024313 | A1 | 1/2014 | Campbell |
| 2016/0049824 | A1 | 2/2016 | Stein et al. |
| 2016/0232794 | A1 | 8/2016 | Hafeez et al. |
| 2016/0259932 | A1 | 9/2016 | Lakshmanan et al. |
| 2016/0379165 | A1* | 12/2016 | Moakley ............... H04W 4/029 705/333 |
| 2017/0013062 | A1 | 1/2017 | Kim et al. |
| 2017/0019144 | A1 | 1/2017 | Malach |
| 2017/0041231 | A1 | 2/2017 | Seed et al. |
| 2017/0078157 | A1* | 3/2017 | Zhang ..................... H04L 41/14 |
| 2017/0086428 | A1 | 3/2017 | Horton et al. |
| 2017/0127606 | A1 | 5/2017 | Horton |
| 2017/0127622 | A1 | 5/2017 | Hong |
| 2017/0170675 | A1* | 6/2017 | Ni Scanaill ............... H02J 7/34 |
| 2017/0195239 | A1* | 7/2017 | Starsinic ............... H04W 28/02 |
| 2017/0195641 | A1 | 7/2017 | Yang et al. |
| 2017/0207926 | A1 | 7/2017 | Gil et al. |
| 2017/0207956 | A1* | 7/2017 | Cabral ................. H04L 41/082 |
| 2017/0223723 | A1* | 8/2017 | Das ..................... H04W 72/048 |
| 2017/0227965 | A1 | 8/2017 | Decenzo et al. |
| 2017/0347283 | A1 | 11/2017 | Kodaypak |
| 2017/0372137 | A1 | 12/2017 | Kumar et al. |
| 2017/0374323 | A1 | 12/2017 | Gornik |
| 2018/0000025 | A1 | 1/2018 | He et al. |
| 2018/0062919 | A1 | 3/2018 | Justin et al. |
| 2018/0069933 | A1 | 3/2018 | Chandra et al. |
| 2018/0074499 | A1 | 3/2018 | Cantrell et al. |
| 2018/0117446 | A1* | 5/2018 | Tran ..................... A63B 71/085 |
| 2018/0139726 | A1 | 5/2018 | Choi et al. |
| 2018/0158019 | A1* | 6/2018 | Vutukuri ................. H04W 4/35 |
| 2018/0184269 | A1 | 6/2018 | Christoval et al. |
| 2018/0199207 | A1 | 7/2018 | Zavesky et al. |
| 2018/0220476 | A1 | 8/2018 | Jung et al. |
| 2018/0262571 | A1 | 9/2018 | Akhtar |
| 2018/0276695 | A1* | 9/2018 | Dione .................... G06N 20/10 |
| 2018/0279319 | A1* | 9/2018 | Yu ....................... H04W 72/085 |
| 2018/0302853 | A1 | 10/2018 | Chandra et al. |
| 2018/0316416 | A1 | 11/2018 | Reis et al. |
| 2018/0324106 | A1* | 11/2018 | Billore ................. H04L 47/781 |
| 2018/0325014 | A1 | 11/2018 | Debbaut |
| 2018/0341533 | A1* | 11/2018 | Shanbhag ............... G06F 9/451 |
| 2019/0075459 | A1 | 3/2019 | Bicket et al. |
| 2019/0372900 | A1* | 12/2019 | Chen .................. H04L 47/2425 |
| 2019/0392328 | A1* | 12/2019 | Gil Bulacio ........... G06N 5/046 |
| 2021/0120075 | A1* | 4/2021 | Brazeau ................ H04L 41/147 |

OTHER PUBLICATIONS

Tripicchio et al. "Towards smart farming and sustainable agriculture with drones" Intelligent Environments (IE), 2015 International Conference, IEEE, 2015. 5 pages.

Mahajan et al. "Drones for Normalized Difference Vegetation Index (NDVI), to Estimate Crop Health for Precision Agriculture: A Cheaper Alternative for Spatial Satellite Sensors" International Conference on Innovative Research in Agriculture, Food Science, Forestry, Horticulture, Aquaculture, Animal Sciences, Biodiversity, Ecological Sciences and Climate Change (AFHABEC-2016), At Jawaharlal Nehru University. 2017. 5 pages.

Murugan et al. "Development of an adaptive approach for precision agriculture monitoring with drone and satellite data" IEEE Journal of Selected Topics in Applied Earth Observations and Remote Sensing 10.12, 2017. 7 pages.

Rokhmana, Catur. "The potential of UAV-based remote sensing for supporting precision agriculture in Indonesia" Procedia Environmental Sciences 24, 2015, 10 pages.

Costa et al. "The use of unmanned aerial vehicles and wireless sensor network in agricultural applications" Geoscience and Remote Sensing Symposium (IGARSS), 2012 IEEE International, IEEE, 2012. 5 pages.

McKinnon, Tom. "Agricultural Drones: What Farmers Need to Know." 2016. Agribotix LLC. 9 pages.

Office Action dated Sep. 18, 2019 for U.S. Appl. No. 16/264,362, 23 pages.

Popescu et al. "A Collaborative UAV-WSN Network for Monitoring Large Areas" Sensors, 2018, 25 pages.

Non-Final Office Action received for U.S. Appl. No. 16/851,662 dated Jun. 23, 2020, 23 pages.

* cited by examiner

GLOBAL INTERNET OF THINGS (IOT) QUALITY OF SERVICE (QOS) REALIZATION THROUGH COLLABORATIVE EDGE GATEWAYS

TECHNICAL FIELD

The subject disclosure relates to wireless communications, e.g., utilization of collaborative edge gateways for providing unified quality of service (QoS) for global Internet of things (IoT).

BACKGROUND

Internet of things (IoT) technology holds a great promise for the future of the global communications industry. As the number of connected devices that can establish connectivity with other devices and/or passive objects to exchange data continues to rise steadily, the IoT technology gains widespread proliferation in the information technology industry. With an anticipated projection of over 20 billion devices in the next few years, service providers, network providers and/or cloud providers will observe a net increase in their traffic handling capabilities. This can help the providers enable new IoT services tailored to targeted industry verticals. While there are several ongoing competitive developments in the IoT domain, some key areas where there is an immediate focus include smart city, transportation and/or utility services, virtual and augmented reality, etc. Low power wide area networking technologies using third generation partnership project (3GPP) defined standards and their ongoing evolution towards fifth generation (5G) seem to provide a solid framework to support such massive IoT initiatives.

Conventional network providers offer IoT services nationally (e.g., within the United States) and have complete control of the network within the country to efficiently manage a service level agreement (SLA). However, offering IoT service internationally, can create new challenges for network providers with regards to QoS/SLA management.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
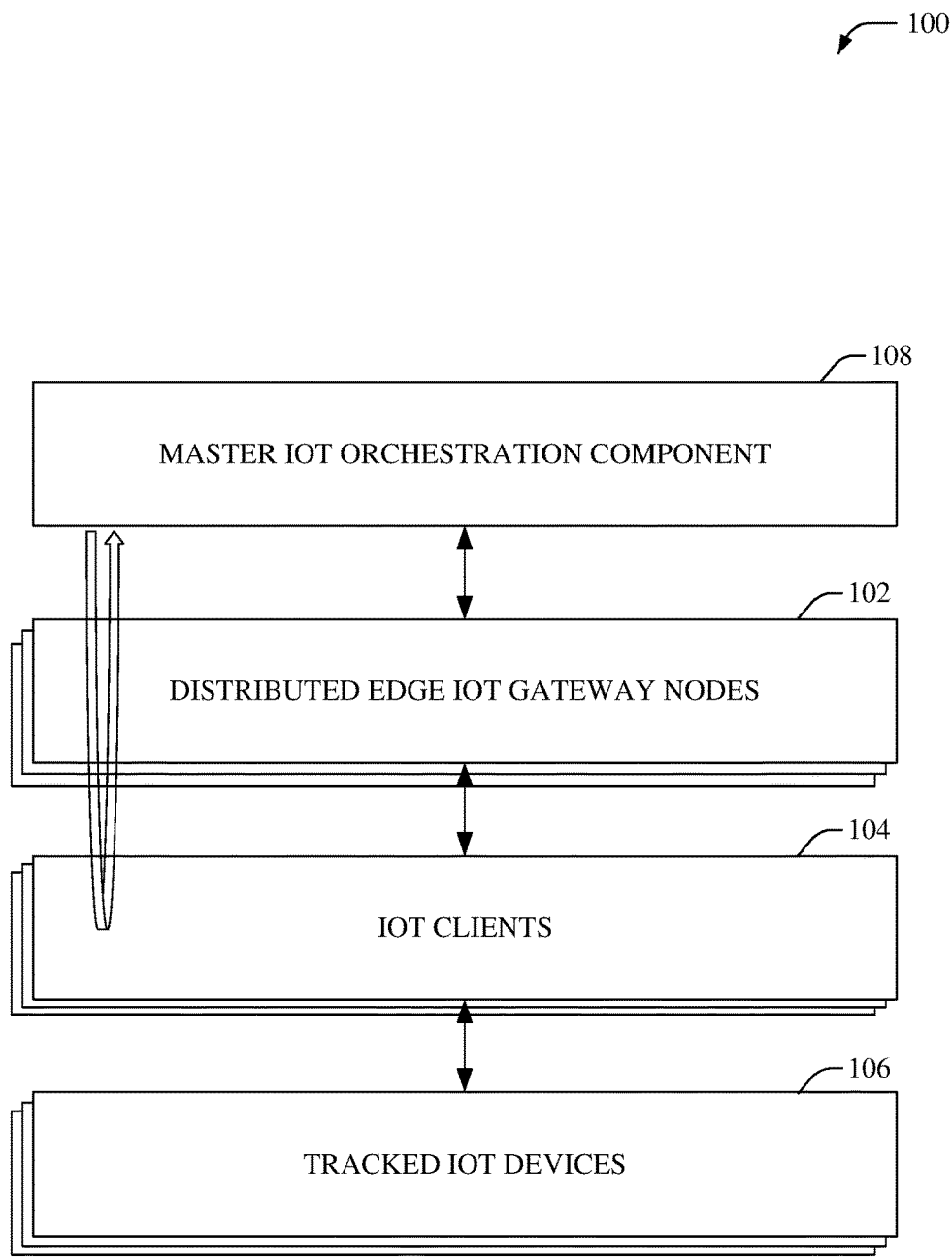
FIG. 1 illustrates an example system that provides a global Internet of things (IoT) service management platform that facilitates quality of service (QoS) realization through a network of collaborative edge IoT gateways.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Terms like "user equipment" or similar terminology, refer to a wired or wireless communication-capable device utilized by a subscriber or user of a wired or wireless communication service to receive or convey data, control, voice, video, sound, gaming, or substantially any data-stream or signaling-stream. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Furthermore, it is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), fifth generation (5G) or other next generation networks, third generation partnership project 2 (3GPP2) ultra mobile broadband (UMB), high speed packet access (HSPA), Zigbee, or another IEEE 802.XX technology, low power wide area (LPWA) and/or non-3GPP standard based solutions, such as, but not limited to, Ingenu, Sigfox, and/or LoRa, etc. Additionally, substantially all aspects of the disclosed subject matter can be exploited in legacy (e.g., wireline) telecommunication technologies.

Internet of things (IoT), which is the future of internet connectivity, enables creation of an information rich ecosystem that can enrich modern connected way of life and transform the way in which businesses as well as consumers function today. Typically, IoT/machine-to-machine (M2M) devices can have different characteristics than regular/commercial user equipment (UEs) (e.g., non-IoT devices, such as, but not limited to, smart phones, tablet computers, personal computers, etc.). For example, the IoT/M2M devices collectively generate a much greater number of signaling connections in the mobile core network as compared to regular UEs. Further, in another example, the service/application provider often performs simultaneous device triggering and monitoring for targeted IoT applications and services. The systems and methods disclosed herein can provide various enhancements to conventional entities to enable IoT security, quality of service (QoS), and/or service level agreement (SLA) for international/global IoT services.

As a variety of IoT device categories emerge based on 3GPP standards evolution supporting a multitude of services, there is an increasing demand on the various network functions within the mobility infrastructure to be more intelligent, dynamic, adaptive, and flexible with their interworking to provide the best possible node level functions and end-to-end service behaviors. The systems and methods disclosed herein can provide real-time QoS and/or monitoring capabilities for IoT services through interactions between massively distributed IoT gateways deployed globally that are managed by an edge gateway controller deployed within a cloud. In an aspect, the edge gateway controller can facilitate efficient QoS and/or SLA management for mobile IoT sensors to provide a secure monitoring and/or diagnostic capability for IoT services. Although, the systems and methods disclosed herein are described with respect to globally distributed edge IoT gateways, it is noted that the subject disclosure is not limited to edge IoT gateways that are distributed across different counties and can be distributed nationally as well.

Referring initially to FIG. 1, there illustrated is an example system 100 that provides a global IoT service management platform that facilitates QoS realization through a network of collaborative edge IoT gateways, according to one or more aspects of the disclosed subject matter. Typically, IoT gateway nodes communicate with a variety of sensors that interact with external applications through different radio technologies, such as, but not limited to, radio-frequency identification (RFID), Wifi, 3G, 4G, LTE, 5G, Zigbee, Z-wave, Bluetooth, video streams, etc. The sensors' interaction with their listening IoT gateways plays a key role and an opportunity to provide a secure and unified SLA/QoS to the end users. As an example, system 100 can be employed for various IoT applications, such as, but not limited to, smart manufacturing and/or industrial automation, transportation (e.g., shipping, delivery, ridesharing, connected cars, etc.), energy, wearables (e.g., health/fitness trackers, smart jewelry, etc.), FirstNet, healthcare, etc.

According to an embodiment, system 100 deploys, within edge clouds, a group of distributed edge IoT gateway nodes 102 at various geographical locations nationally and/or internationally, to form a unified communication protocol that enables real-time monitoring of IoT services and support for IoT QoS and/or SLA that is desirable by end users. The edge clouds comprise a networked group of devices that are deployed within the logical extremes of a network (e.g., within a radio access network) away from centralized points (e.g., core mobility network). Moreover, the devices (e.g., distributed edge IoT gateway nodes 102) of the edge clouds allow data produced by tracked IoT devices 106 to be processed closer to where it is created instead of sending it across long routes to core network clouds.

Moreover, the distributed edge IoT gateway nodes 102 can interact with both a software-defined networking (SDN)-like control plane and a mesh formation of the distributed edge IoT gateway nodes 102, to collectively provide opportunity for global workload management and interaction. Moreover, the distributed edge IoT gateway nodes 102 can communicate with IoT clients 104, for example, moving IoT client devices installed in trucks, airplanes, containers, drones, and/or other shipping elements, mobile network operator (MNO)-certified IoT gateways that can be self installed by customers (e.g., shipping industries), etc.

Typically, the IoT clients 104 can listen to and/or communicate with a large assortment of IoT devices 106 (e.g., sensors, etc.). As an example, the tracked IoT devices 106 can comprises, but are not limited to, most any sensors, smart meters, smart home devices, smart city devices, tracking devices, security systems, smart energy grid devices, agricultural devices, connected vehicle, at least partially automated vehicle (e.g., drones), a wearable device (e.g., smart watch, connected glasses, wrist monitor, etc.), smart microelectromechanical systems (MEMS)-based IoT devices etc. It is noted that the tracked IoT devices 106 can be mobile, have limited mobility and/or be stationary. Typically, different categories of IoT devices vary widely in terms of their service requirements, data throughput, latency, access priority and/or connectivity reliability. As an example, a first category of IoT devices can be delay tolerant, whereas a second category of IoT devices can be highly prone to latency errors. Accordingly, different policies and/or preferences with respect to workloads can be defined (e.g., via a master orchestration component 108) for different categories of the IoT devices 106.

In an aspect, the master IoT orchestration component 108 can be utilized to manage the distributed edge IoT gateway nodes 102 and coordinate workloads across the distributed edge IoT gateway nodes 102. For example, the master IoT orchestration component 108 can configure, assign, update, and/or terminate thin workloads for specific gateways of the distributed edge IoT gateway nodes 102. The workloads can specify tasks and/or actions that are to be performed based on measurements received from the tracked devices 106. For example, in a shipping application, the master IoT orchestration component 108 can instantiate one or more IoT thin workloads at gateways that are deployed at target locations along a path on which the tracked device is expected to travel. Moreover, the distributed edge gateway nodes 102 can run a large number (e.g., millions) of thin workloads that each represent one or more prediction or expectation of a tracked device 106.

The master IoT orchestration component 108 can be responsible for determining SLA declaration parameter sets that define the expected SLA/QoS associated with a tracked device 106. As an example, a declaration parameter can provide expected and unexpected states associated with the service, QoS, and/or interaction methods. Further, the master IoT orchestration component 108 can receive workload state feedback from each workload triggered by its associated sensor(s). Based on an analysis of the state feedback (and/or one or more machine learning techniques), the master IoT orchestration component 108 can terminate and/or reconfigure the current workload and/or activate one or more new workloads at another IoT gateway (e.g., deployed at a next expected location for a shipment).

The distributed IoT gateway nodes 102 form a structured mesh network globally over the Internet that can communicate asynchronously and/or synchronously. In one aspect, the distributed IoT gateway nodes 102 can implement advanced collaborative and/or distributed technologies (e.g., Blockchain) to track/monitor QoS and SLA globally. As an example, a metadata (e.g., token) that represents workload state (e.g., summary of tasks performed, verified parameters, estimated time of arrival at next location, expected state at next location, etc.) can be transferred from one IoT gateway node to another. Collectively these states can be analyzed (e.g., by the master IoT orchestration component 108) to determine expected and unexpected scenarios, and accordingly, appropriate QoS and SLA service monitoring can be provided. For example, when a customer is shipping a shipment that is tracked by sensors inside the shipment from US city of Cupertino to city of Milan, Italy, the path for this shipment can be provided to the master IoT orchestration component 108. The master IoT orchestration component 108 can compile the path into the expected passages through the edge IoT gateway nodes 102 along the path and can schedule workloads into these nodes. The desired/expected scenarios are that the shipment states and sensor states are reported as the shipment moves through the nodal IoT gateway passages. As an example, the undesirable/unexpected states are when an expected sensor is not received in timely manner, is received at another edge IoT gateway node, incorrect/different states or incorrect/different set of devices are reported, etc. The asynchronous programming of the edge IoT gateway nodes for expected work load provides an optimized QoS monitoring service and unexpected results interaction among the edge IoT gateway nodes 102 and with the master IoT orchestration component 108 provides monitoring capabilities of these devices.

Figure 2:
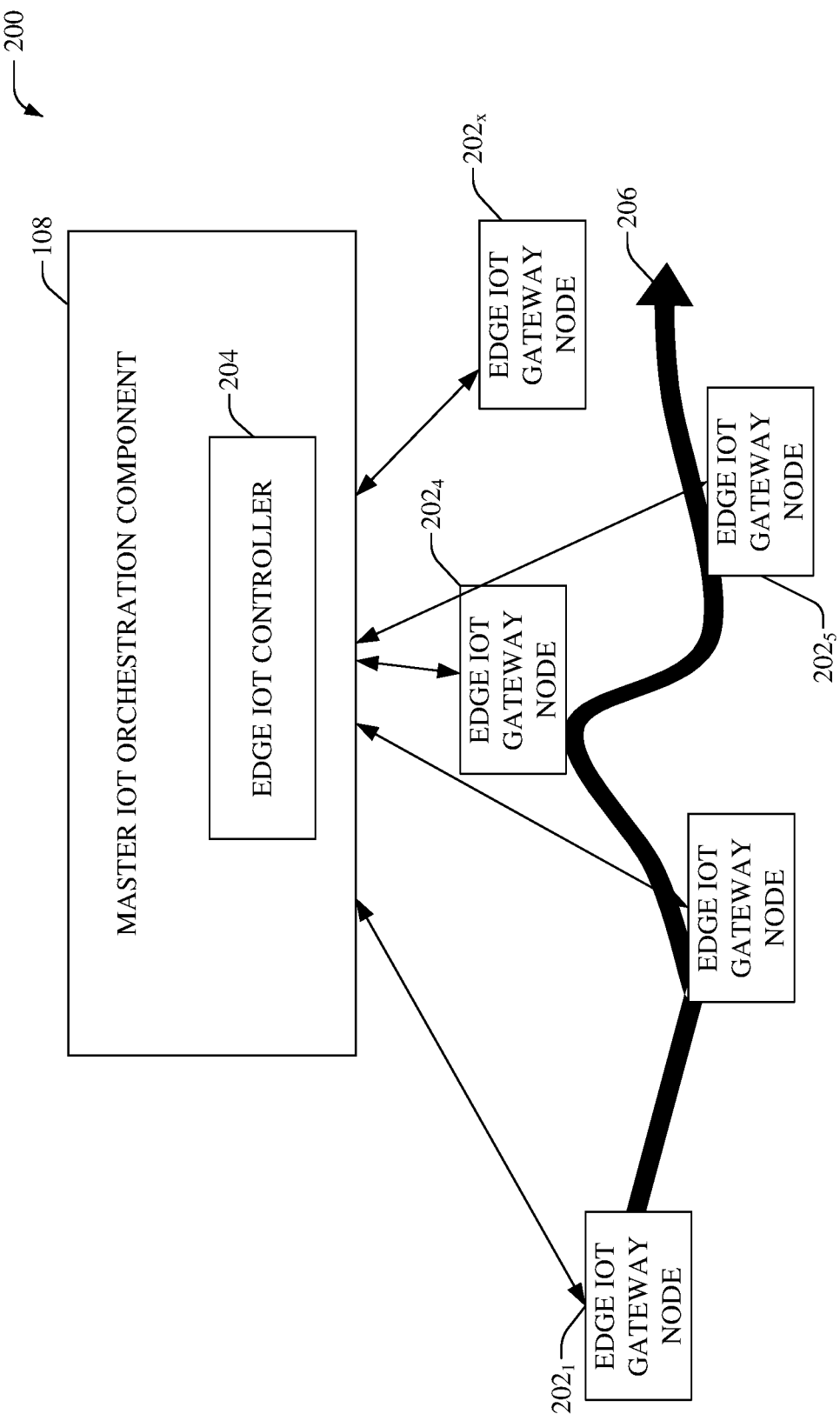
FIG. 2 illustrates an example system that facilitates workload management across globally distributed edge IoT gateways to provide services for mobile IoT devices.

Referring now to FIG. 2, there illustrated is an example system 200 that facilitates workload management across globally distributed edge IoT gateways to provide services for mobile IoT devices, in accordance with an aspect of the subject disclosure. It is noted that the master IoT orchestration component 108 can comprise functionality as more fully described herein, for example, as described above with regard to system 100. Further, the distributed edge IoT gateway nodes 102, as described above with regard to system 100, can comprise edge IoT gateway nodes $202_1$-$202_x$ (wherein x can be most any integer).

According to an aspect, MNOs can employ system 200 to provide IoT services by utilizing their edge gateway clouds (e.g., comprising edge IoT gateway nodes $202_1$-$202_x$), wherein their mobile networks (e.g., LTE, 5G, etc.) can logically be extended with roaming partners to backhaul, track and manage IoT hotspots internationally. As an example, edge IoT gateway nodes $202_1$-$202_x$ can be deployed at the deep edges in roaming spaces and can proxy manage any sensor associated with an IoT service associated with the MNO's customers. The edge IoT gateway nodes $202_1$-$202_x$ can be deployed nationally and/or globally to form a structured mesh of edge gateways that are highly connected (e.g., via LTE, Internet, and/or other communication technology) and can perform one or more IoT workloads assigned by an edge IoT controller 204. Moreover, the edge IoT gateway nodes $202_1$-$202_x$ can collectively form a distributed system that is controlled via the edge IoT controller 204 and/or MNO's control plane devices. In an aspect, the edge IoT controller 204 can spin up millions of thin workloads (e.g., low overhead processes) as the sensors are recognized and/or sensor data is received by one or more roaming operators (e.g., IoT clients 104). Software-defined flexibility and control of the edge IoT gateway nodes $202_1$-$202_x$ can be provided by employing open (e.g., non-proprietary, standardized, protocol-agnostic, etc.) IoT gateway application program interfaces (APIs) and/or stack ecosystems. Further, in some embodiments, the edge IoT controller 204 can utilize machine learning (ML)-based models for realization of additional QoS, SLA, and/or monitoring services.

Referring back to FIG. 2, there illustrated is an example expected path 206 associated with one or more tracked IoT devices. As an example, path 206 can comprise a shipment route that is typically travelled by a truck delivering a package to a destination. It is noted that the tracked IoT devices can be mobile themselves and/or can be placed within/attached to a vehicle/container that is mobile. Based on the expected path 206, the edge IoT controller 204 can assign and/or coordinate workloads to IoT gateway nodes that are deployed at locations along the path, for example, edge IoT gateway nodes $202_1$-$202_5$. As an example, edge IoT gateway nodes $202_1$-$202_x$ can be owned, leased, and/or managed by the MNO. As a mobile IoT device (e.g., a shipment) moves through various locations (e.g., from homes, to trucks, to airports, to storage containers, etc.), it can interact with edge IoT gateway nodes $202_1$-$202_5$, which can then perform actions based on the workload(s) assigned to them. For example, the edge IoT controller 204 can determine and/or predict arrival time of the shipment at the edge IoT gateway nodes $202_1$-$202_5$ and accordingly, coordinate the workloads locally and/or internationally. Moreover, the edge IoT controller 204 can control the edge IoT gateway nodes $202_1$-$202_5$ and facilitate management and/or scheduling workloads across the nodes as it expects the shipment to move though the areas at which the gateways are deployed.

Further, in one aspect, edge IoT controller 204 can learn and build from internal states and/or external states associated with the service. As an example, internal states can comprise workload state information received from the edge IoT gateway nodes $202_1$-$202_x$, such as, but not limited to, arrival and/or departure time, sensor measurements (e.g., temperature of a container, image and/or video if the container, parameters associated with the vehicle, etc.), package characteristics, etc. Moreover, if determined that the internal state has deviated from a normal range, the edge IoT controller 204 can update, terminate, and/or reassign workloads. The external states can be received from external devices (e.g., web servers, content servers, etc.) and can comprise information, such as, but not limited to, news, weather data, event schedules, etc. For example, in response to determining that severe weather conditions are being experienced in an area through which the shipment is originally being routed, the edge IoT controller 204 can predict whether the shipment would be rerouted to/through another location and accordingly, reassign the workload to another IoT gateway node (e.g., IoT gateway node $202_x$) to perform the defined action(s) (e.g., expect the shipment, take action/perform functions on arrival/departure, report sensor measurements, check for error, failure, and/or alert conditions, etc.). Accordingly, as path changes are detected (e.g., shipment is received at an IoT gateway node that is not located on/near the original route, shipment is received earlier or later than expected, etc.) and/or are predicted (e.g., via internal state data, external state data, ML, etc.), the edge IoT controller 204 can dynamically update workload configuration across the edge IoT gateway nodes $202_1$-$202_x$.

According to an embodiment, the edge IoT gateway nodes $202_1$-$202_x$ can communicate with each other via a structured mesh network to facilitate tracking and/or security. Technologies, such as but not limited to, Blockchain can be utilized to generate tokens that can be transferred between the edge IoT gateway nodes $202_1$-$202_x$. As an example, the token generated by an IoT gateway node can provide a summary of a shipment state comprising a number of packages within the shipment, type of packaging, contents of a package, actions performed at the IoT gateway node, a result of the actions performed at the IoT gateway node, departure time from the IoT gateway node, estimated arrival time of the shipment at the next IoT gateway node along the path, route information, etc.

Figure 3:
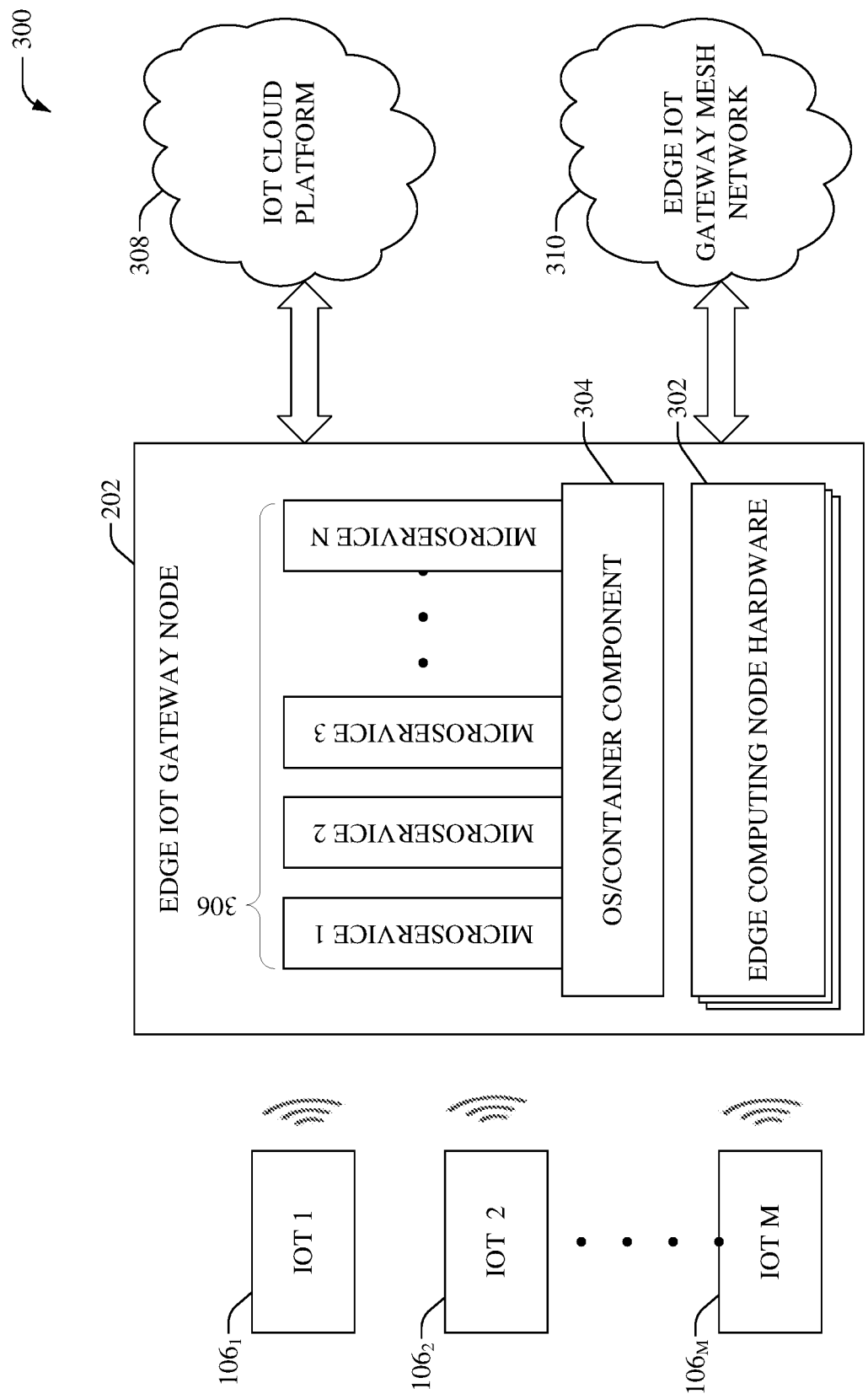
FIG. 3 illustrates an example system that comprises an edge IoT gateway node utilized to facilitate a global IoT service.

Referring now to FIG. 3, there illustrated is an example system 300 that comprises an edge IoT gateway node 202 utilized to facilitate a global IoT service, in accordance with an aspect of the subject disclosure. As an example, the edge IoT gateway node 202 can comprise a MNO-managed edge gateway that can be deployed nationally and/or internationally. It is noted that the edge IoT gateway node 202 can be substantially similar to edge IoT gateway nodes $202_1$-$202_x$ and can comprise functionality as more fully described herein, for example, as described above with regard to edge IoT gateway nodes $202_1$-$202_x$. Further, IoT devices $106_1$-$106_M$ (e.g., wherein M is most any integer) can be substantially similar to tracked IoT devices 106 and can comprise functionality as more fully described herein, for example, as described above with regard to tracked IoT devices 106.

Typically, the edge IoT gateway node 202 can comprise edge computing node hardware 302 (e.g., compute and storage resources) and an operating system (OS)/container component 304 that execute workloads via microservices 1-N 306. As an example, the microservices 1-N 306 can be a suite of independently-deployable, small, modular services, wherein each service runs a unique process and communicates with the other over standard protocols with well-defined interfaces to serve a business goal. Moreover, the workloads can be assigned and/or initiated via instructions received from the IoT cloud platform (e.g., via edge IoT controller 204). In one aspect, the workloads can be initiated on receiving a broadcast message from IoT devices $106_1$-$106_M$, as they approach the edge IoT gateway node 202. Moreover, the IoT devices $106_1$-$106_M$ can be programmed to broadcast messages when they reach particular locations and/or enter certain areas (e.g. location of the edge IoT gateway node 202). Additionally, or alternatively, the edge IoT controller 204 can instruct the edge IoT gateway node 202 to initiate the workloads at an estimated time of arrival of the IoT devices $106_1$-$106_M$. According to an aspect, the edge IoT controller 204 can define one or more policies for the initiation of workloads based on various parameters, for example, IoT arrival time, IoT measurement data, current time, historical preferences, etc. Typically, the edge IoT gateway node 202 can initiate different workloads in response to detecting expected scenarios or detecting anomalies. For example, if determined that the IoT device $106_1$ arrives at the expected time, a first set of actions can be performed; if determined that the IoT device $106_1$ arrives before the expected time, a second set of actions can be performed; and if determined that the IoT device $106_1$ arrives after the expected time, a third set of actions can be performed.

It is noted that the actions are not limited to automated actions (e.g., classifying the shipment as undamaged, changing a temperature of a container, verifying that packages are not misplaced, stolen, replaced, etc.) and can also comprise manual actions performed by authorized personnel. For example, if sensor data received from IoT device $106_1$ is determined to be in a high range and/or weather data along the route indicates high temperatures (e.g., above a defined temperature threshold), a workload can be initiated that alerts (e.g., via sending messages to UEs) appropriate persons to add coolant/ice to the packaging of the shipment. Manually performed actions can then be entered into the system (e.g., via messages sent from a UE or input via a user interface of/coupled to the edge IoT gateway node 202) and can be utilized to generate state data associated with one or more workloads. Moreover, state data can comprise, but is not limited to, a summary of actions performed at the edge IoT gateway node 202, anomalies detected, timing data associated with arrival and/or departure of the IoT device, workload QoS and/or SLA atomic measurements with action selection functions that represent the received sensory transaction, etc. The state data can be provided, via IoT cloud platform 308, as feedback to the edge IoT controller 204, which can analyze the feedback to facilitate global QoS and/or SLA management. Additionally, or optionally, at least a portion of the state data can be provided to another edge IoT gateway node(s) (e.g., the next edge IoT gateway node on the path travelled by the IoT device $106_1$) via edge IoT gateway mesh network 310. According to an embodiment, the edge IoT gateway node 202 can dynamically form logical connections to any other edge IoT gateway node(s) as IoT QoS/SLA measurements can be aggregated. Moreover, the IoT states can also become available through open and/or collaborative APIs and/or offline through alternative channels. Further, in one aspect, the edge IoT gateway node 202 can utilize advanced collaborative and/or distributed blockchain techniques to facilitate tracking QoS and SLA globally, for example, by transferring tokens to other edge IoT gateway node(s) via edge IoT gateway mesh network 310 (and/or to the edge IoT controller 204 via IoT cloud platform 308).

Figure 4:
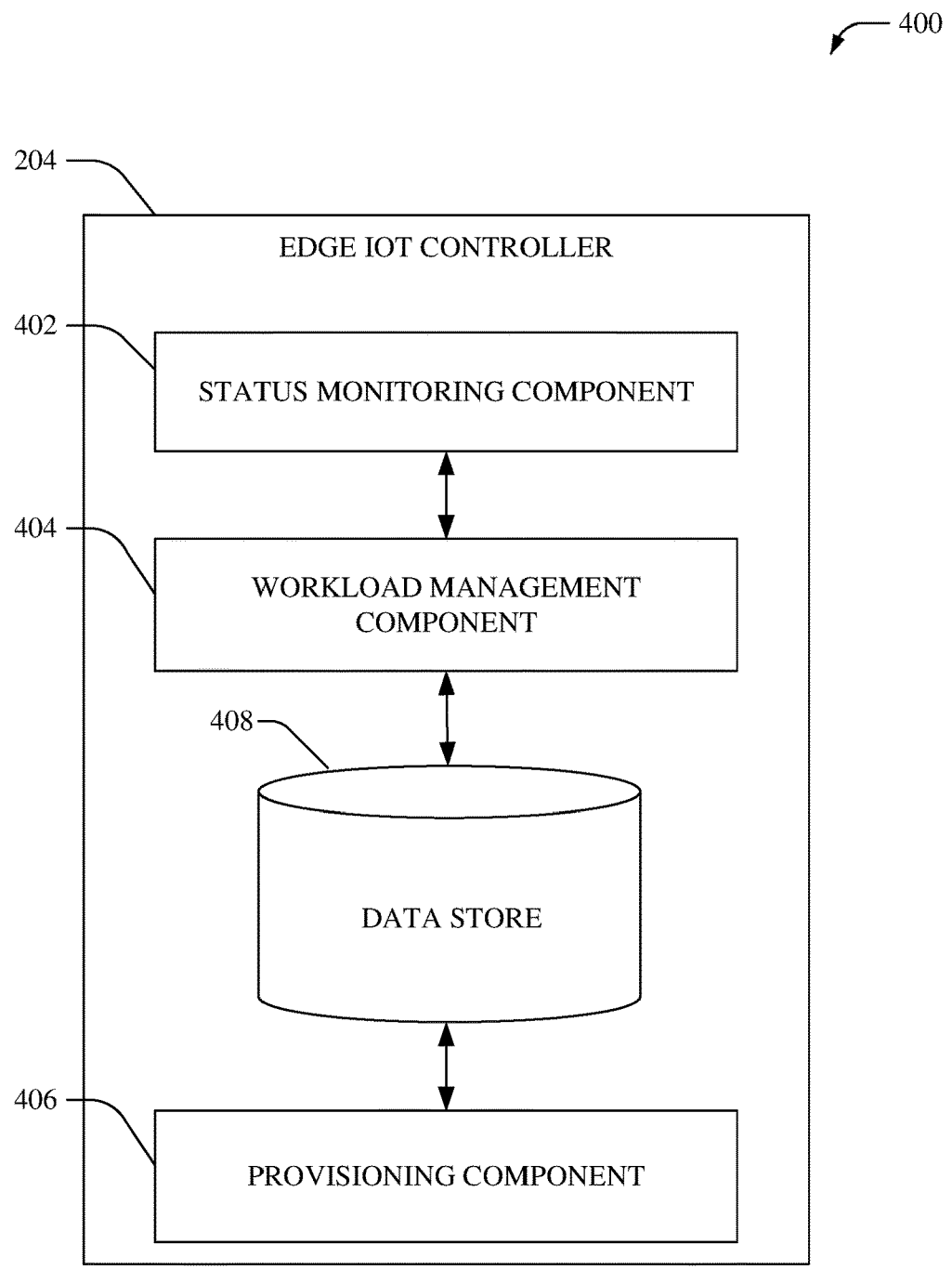
FIG. 4 illustrates an example system for global QoS and/or service level agreement (SLA) management for IoT services.

Referring now to FIG. 4, there illustrated is an example system 400 for global QoS and/or SLA management for IoT services, according to an aspect of the subject disclosure. It is noted that the edge IoT controller 204 can comprise functionality as more fully described herein, for example, as described above with regard to system 200. In one embodiment, the edge IoT controller 204 can comprise a status monitoring component 402 that can receive internal and/or external state data. In an example, the internal state data can be received from one or more of the distributed IoT gateway nodes 102 and can comprise information such as, but not limited to, a report of tasks performed, received sensor measurements, error/failure conditions, alerts, and/or unexpected scenarios (e.g., shipment is delayed or received earlier than expected, shipment arrives at an IoT gateway node that is not expecting the shipment, shipment size has changed, etc.). In another example, the external state data can be received from web servers, content servers, application server, customer devices, etc. and can comprise information such as, but not limited to, schedule information, event data, news, weather data, traffic reports, customer preferences or instructions, etc.

According to an embodiment, a workload management component 404 can be utilized to analyze the status data to schedule QoS-aware workloads. Moreover, the workload management component 404 can schedule and/or manage the QoS-aware workloads based on machine learning and/or big data analytics (e.g., image recognition, identity, validation, classification, etc.) For example, if an image (or other measurement data) of a package received from two (or more) edge IoT gateway nodes indicates that a size, shape, color, etc. has changed, then a workload can be created to flag the package and notify appropriate personnel to check on the package. In another example, if a shipment is rerouted due to traffic congestion or weather conditions, workloads can be assigned to and initiated (e.g., at expected time of arrival of the shipment) at a new edge IoT gateway node that is deployed at a location on the new route.

In one aspect, a provisioning component 406 can receive customer preferences and/or instructions via one or more customer devices and/or portals (not shown). For example, a path for routing tracked IoT devices (e.g., a shipment) can be provided via the provisioning component 406 and stored within data store 408. According to an embodiment, the workload management component 404 can compile the path into a group of expected passages through select edge IoT gateway nodes deployed along the path and schedule workload into these edge IoT gateway nodes. A first set of workloads can be performed in response to detecting desired/expected scenarios associated with the reported shipment states and/or sensor states and a second set of workloads can be performed in response to detecting undesired/unexpected scenarios associated with the reported shipment states and/or sensor states. The asynchronous programming of the edge IoT gateway nodes for the workloads can provide a highly efficient and optimal QoS monitoring It is noted that data store 408 can store information, such as, but not limited to, monitored status data, operator preferences and/or policies, customer preferences and/or policies, etc. that can be analyzed to facilitate workload management (e.g., by the workload management component 404). Although data store 408 is depicted to reside within the edge IoT controller 204, it is noted that the subject specification is not that limited and the data store 408 can reside (e.g., completely or partially) outside the edge IoT controller 204 and can be remotely coupled to the edge IoT controller 204. It is noted that the data store 408 can comprise volatile memory(s) or nonvolatile memory(s), or can comprise both volatile and nonvolatile memory(s). Examples of suitable types of volatile and non-volatile memory are described below with reference to FIG. 9. The memory (e.g., data stores, databases) of the subject systems and methods is intended to comprise, without being limited to, these and any other suitable types of memory.

Figure 5:
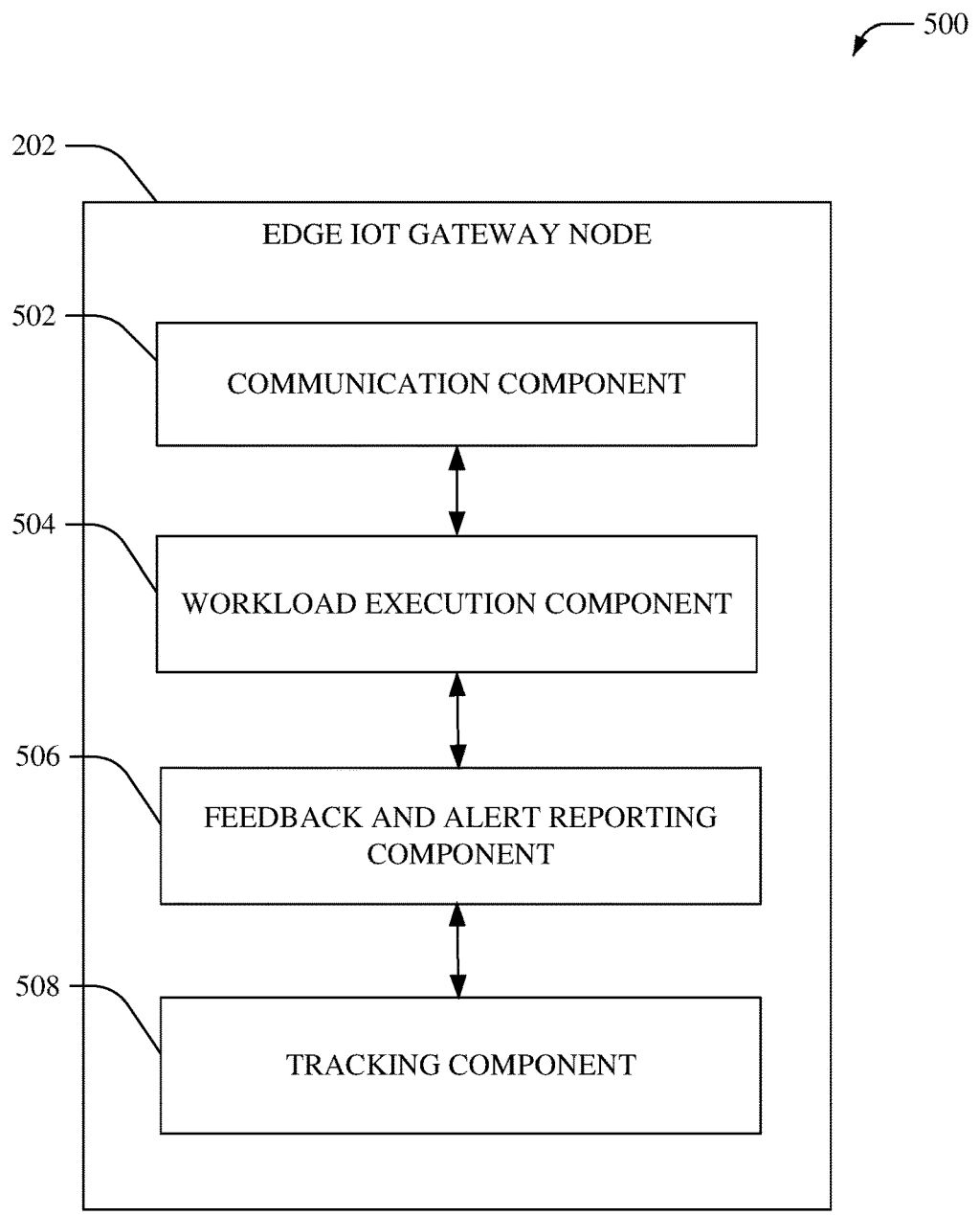
FIG. 5 illustrates an example system that comprises a self-forming, self-healing, and/or collaborative edge IoT gateway, according to an aspect of the subject disclosure.

FIG. 5 illustrates an example system 500 that comprises a self-forming, self-healing, and/or collaborative edge IoT gateway, according to an aspect of the subject disclosure. MNOs can introduce global IoT services utilizing their edge gateway clouds where their LTE networks can logically be extended with roaming partners to backhaul, track, and manage IoT hotspots (e.g., edge IoT gateway node 202) internationally. IoT SLA data paths and/or measurements can be further realized through higher abstraction of network key performance indicator (KPI) that can be shared between the collaborative operators or edge IoT gateway nodes. It is noted that the edge IoT gateway node 202 can comprise functionality as more fully described herein, for example, as described above with regard to systems 200-300.

In one aspect, a communication component 502 can be utilized to interact with IoT devices and/or clients to receive measurement data, for example, when the IoT devices and/or clients arrive at and/or couple to the edge IoT gateway node 202. Based on the received measurement data, a workload execution component 504 can run one or more workloads assigned by an edge IoT controller. As an example, the workloads can classify the data (e.g., classify the package as damaged or satisfactory), authenticate a device identifier (e.g., verify that the package has not been misplaced, lost, stolen. replaced, etc.), and/or enforce most any defined policy(ies). For example, a policy, determined by the edge IoT controller, can specify a list of actions that are to be performed for a particular shipment with a specified group identifier/device identifier. Actions can comprise, but are not limited to, recording sensor measurements and/or a photo/video of a box, classifying that the box is not damaged and/or verifying that the image matches reference image, scanning barcode/RFID code to ensure accuracy; etc. A feedback and alert reporting component 506 can be utilized to determine state data associated with the workload (e.g., summary of actions performed, anomalies detected, etc.)

and report the state data to the edge IoT controller and optionally to other edge IoT gateway nodes. As an example, the state data can become available through open and/or collaborative APIs or offline through alternative channels.

Further, a tracking component 508 can be utilized to transfer status data and/or other information to edge IoT gateway nodes via a structured mesh network (e.g., through LTE networks and/or Internet). Typically, the edge IoT gateway node 202 can dynamically form logical connections to any other nodes as aggregated IoT QoS/SLA measurements can be aggregated. In one embodiment, the tracking component 508 can utilize Blockchain technology to create and transfer tokens and/or metadata to one or more other edge IoT gateway nodes to facilitate tracking and/or security.

Figure 6:
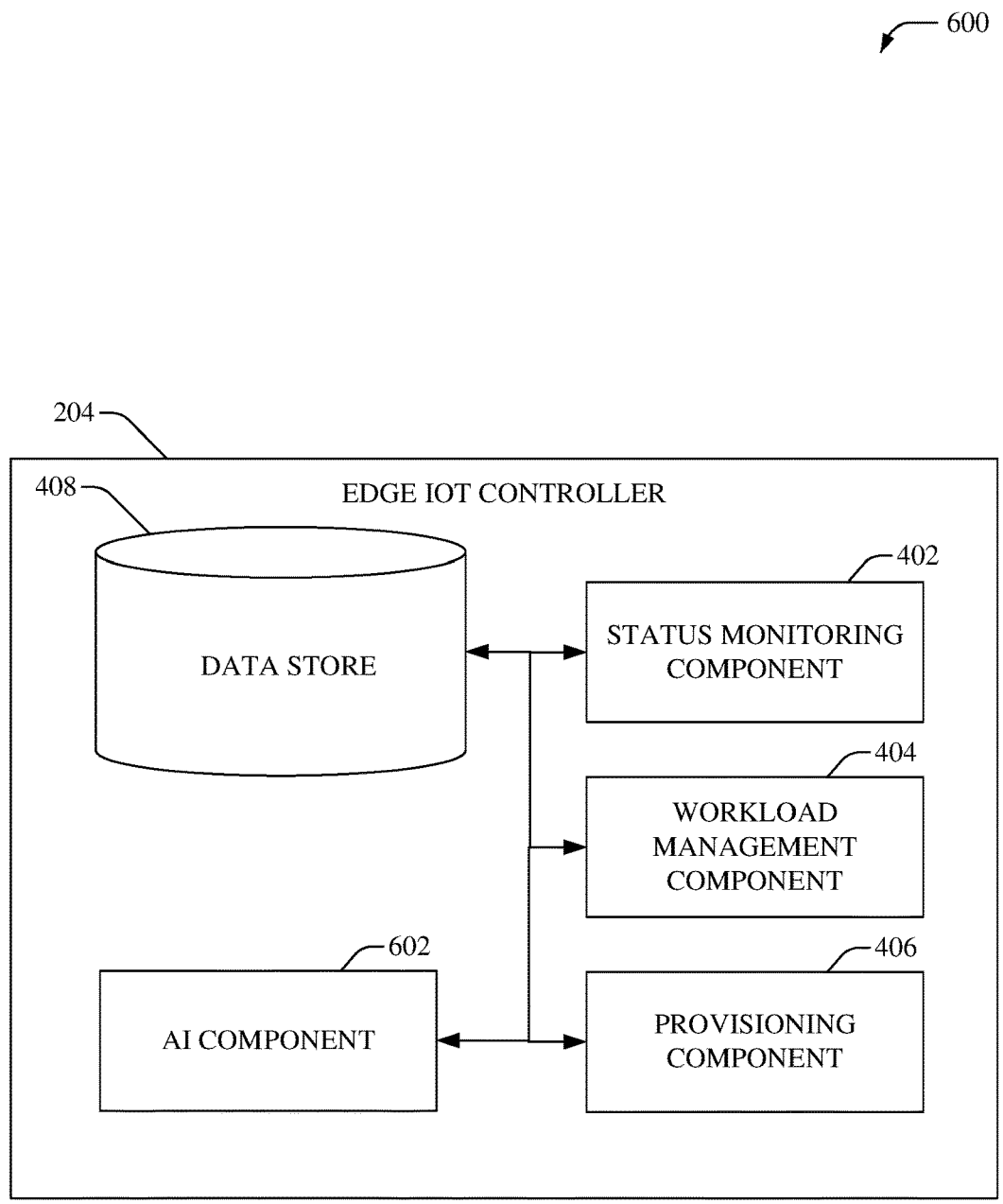
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the edge IoT controller 204, status monitoring component 402, workload management component 404, provisioning component 406, and data store 408 can comprise functionality as more fully described herein, for example, as described above with regard to systems 200-500.

In an example embodiment, system 600 (e.g., in connection with automatically managing workloads) can employ various AI-based schemes (e.g., intelligent processing/analysis, machine learning, etc.) for carrying out various aspects thereof. For example, a process for scheduling, updating, and/or terminating workloads can be facilitated via an automatic classifier system implemented by AI component 602. Moreover, the AI component 602 can exploit various artificial intelligence (AI) methods or machine learning methods. Artificial intelligence techniques can typically apply advanced mathematical analysis—e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, hidden markov models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to a predetermined criteria, when and which workloads are to be initiated, IoT edge gateways nodes at which specific workloads are to be instantiated, actions that are to be performed, updates that are to be made to a workload, when a workload is to be terminated, etc. The criteria can comprise, but is not limited to, historical patterns and/or trends, network operator preferences and/or policies, customer preferences, predicted traffic flows, event data, latency data, reliability/availability data, current time/date, workload state feedback data, weather data, type of IoT device, news, and the like.

The next generation of devices and their smart connectivity as well as message delivery in the mobility infrastructure places significant demands on the networks to be intelligent, dynamic, flexible, proactive, and maintain closed-loop active communication. According to an embodiment, the network architecture disclosed herein provides several non-limiting advantages and features such as, but not limited to global IoT QoS realization and improved network resiliency and/or robustness through collaborative edge gateways.

Figure 7:
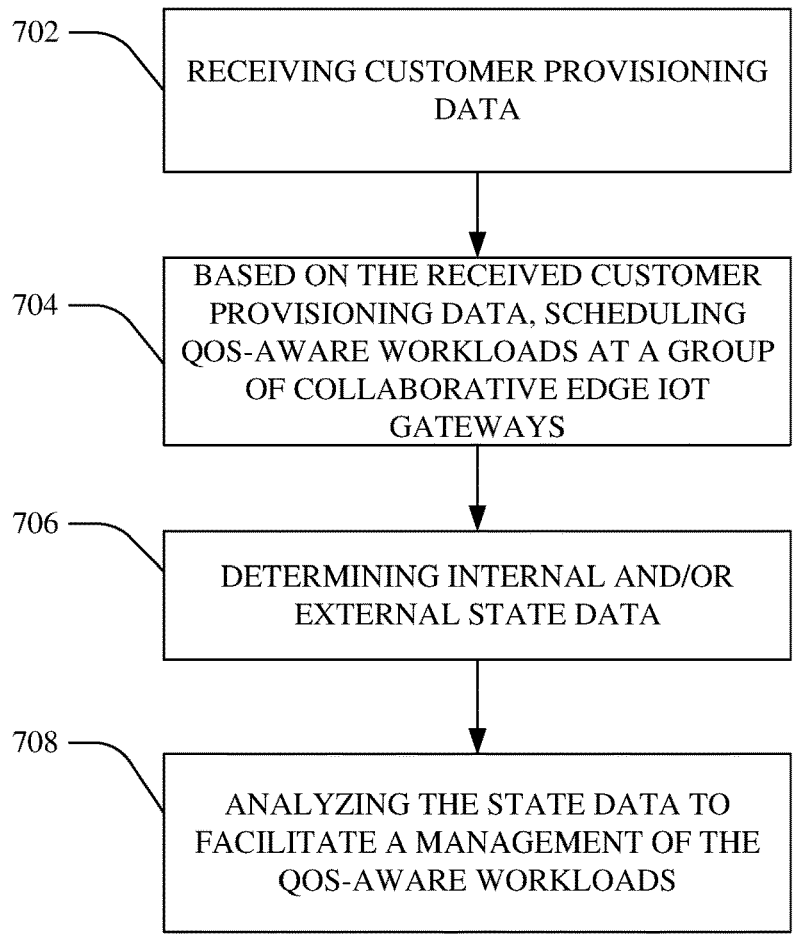
FIG. 7 illustrates an example method that facilitates global QoS realization through management of a network of collaborative edge IoT gateways.
Figure 8:
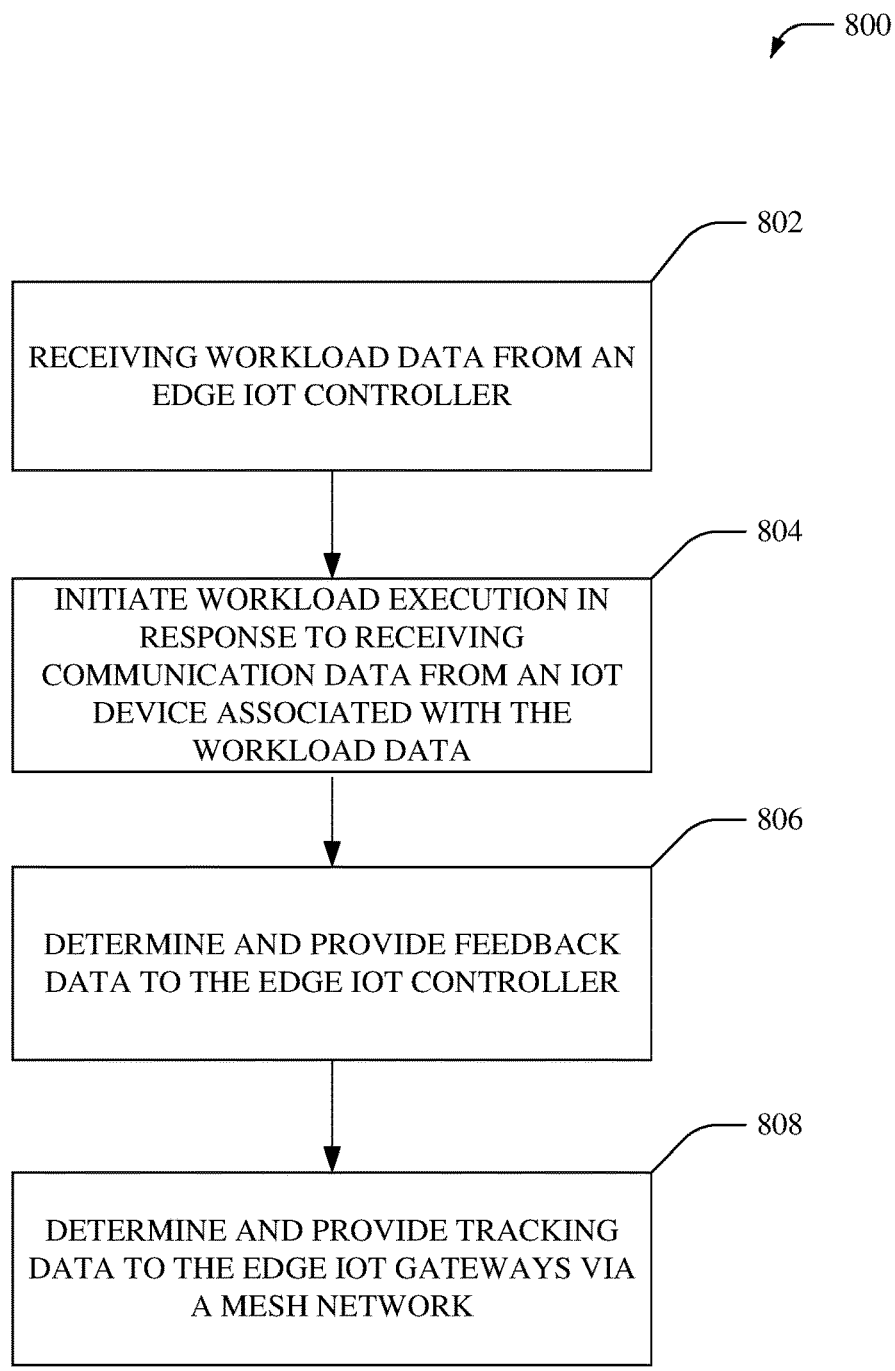
FIG. 8 illustrates an example method for providing realtime QoS and monitoring capabilities for global IoT services.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates global QoS realization through management of a network of collaborative edge IoT gateways, according to an aspect of the subject disclosure. In an aspect, method 700 can be implemented by one or more control plane devices (e.g., edge IoT controller 204) of a communication network (e.g., cellular network). At 702, customer provisioning data can be received. For example, the customer provisioning data can comprise, but is not limited to, shipping routes, customer preferences and/or policies, IoT device information, etc. In one aspect, the provisioning data can be utilized to identify edge IoT gateways that are located along one or more shipping routes and accordingly, at 704, QoS-aware workloads can be scheduled at the identified edge IoT gateways.

Further, at 706, internal and/or external state data can be determined. In an example, the internal state data can be received from one or more of the distributed IoT gateway nodes and can comprise workload state information such as, but not limited to, a report of tasks performed, received sensor measurements, error/failure conditions, alerts, and/or unexpected scenarios. In another example, the external state data can be received from web servers, content servers, application server, customer devices, etc. and can comprise information such as, but not limited to, schedule information, event data, news, weather data, traffic reports, customer preferences or instructions, etc. At 708, the state data can be analyzed (e.g., based on ML techniques) to facilitate a management of the QoS-aware workloads. For example, the QoS-aware workloads can be updated and/or terminated, and/or new QoS-aware workloads can be scheduled at different (or the same) edge IoT gateways to provide optimal QoS monitoring.

FIG. 8 illustrates an example method 800 for providing real-time QoS and monitoring capabilities for global IoT services, according to an aspect of the subject disclosure. As an example, method 800 can be implemented by one or more edge network devices (e.g., edge IoT gateway node 202) of a communication network (e.g., cellular network). At 802, workload data can be received from an edge IoT controller. As an example, the workload data can comprise a set of actions that are to be performed via one or more microservices executed by the edge IoT gateway node. Further, at 804, the execution of the workload can be initiated in response to receiving communication data (e.g., broadcast messages) from an IoT device associated with the workload data. for example, the workload can be initiated in response to determining that the IoT device has entered a geographical area served by the edge IoT gateway node and/or is coupled to the edge IoT gateway node.

Furthermore, at 806, feedback data can be determined and provided to the edge IoT controller at most any time, for example, prior to, subsequent to, and/or during the workload execution. As an example, the feedback data can comprise, but is not limited to, a summary/list/result of actions performed via workload execution, measurements received from the IoT device, failure/error conditions, unexpected behavior and/or situations, alerts, etc. Moreover, the edge IoT controller can utilize the feedback data to manage (e.g., update, terminate, reassign, etc.) the workloads. In addition, at 808, tracking data can be determined and provided to other edge IoT gateways via a mesh network, for example, to facilitate tracking and/or security (e.g., by employing a Blockchain technology).

Figure 9:
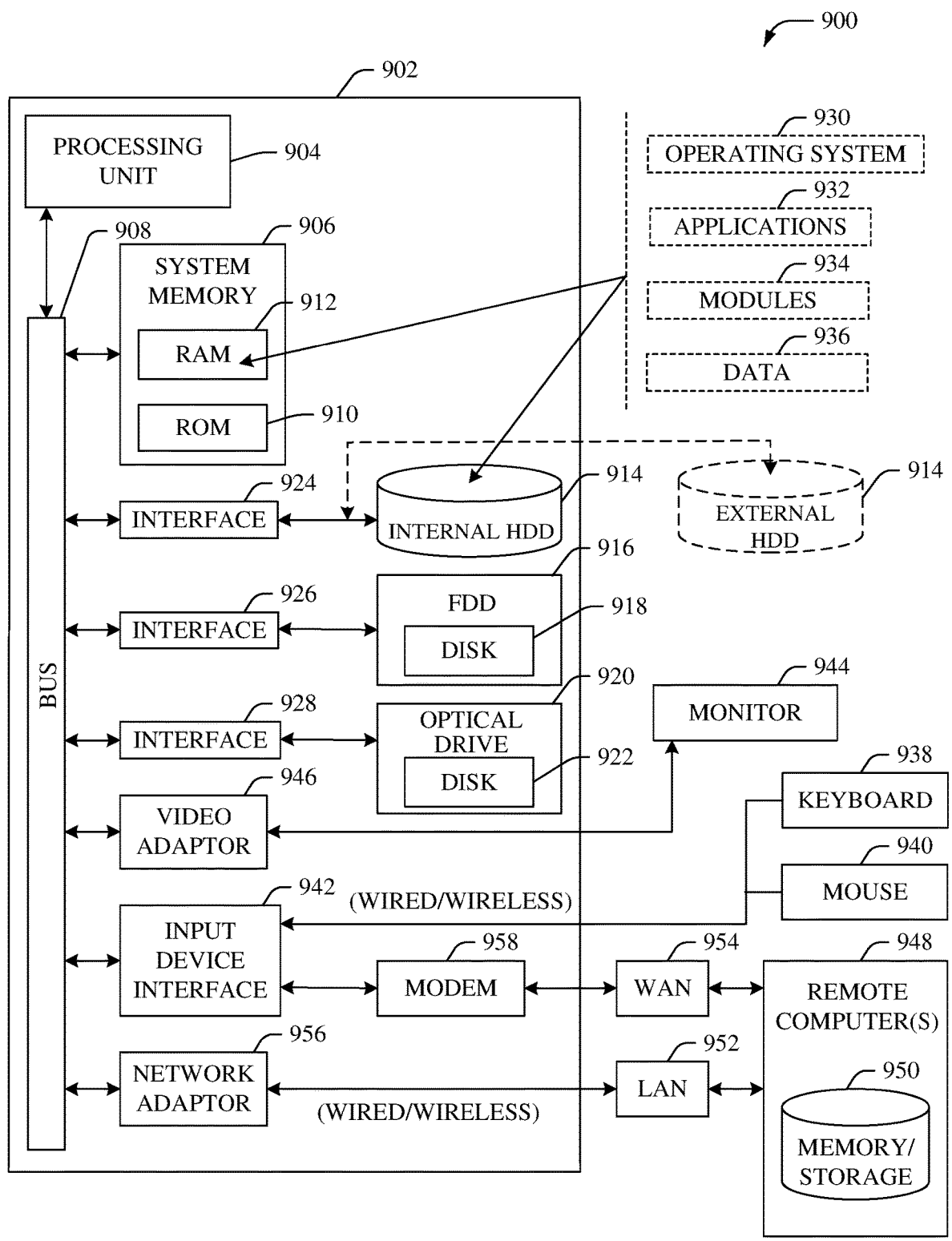
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 9, the example environment 900 for implementing various aspects of the specification comprises a computer 902, the computer 902 comprising a processing unit 904, a system memory 906 and a system bus 908. As an example, the component(s), application(s), client(s), server(s), equipment, system(s), interface(s), gateway(s), controller(s), node(s), cloud(s), entity(ies), function(s), platform(s), and/or device(s) (e.g., distributed edge IoT gateway nodes 102, IoT clients 104, tracked IoT devices 106, IoT devices 106$_1$-106$_M$, master IoT orchestration component 108, edge IoT gateway nodes 202$_1$-202$_x$, edge IoT controller 204, edge computing node hardware 302, OS/container component 304, IoT cloud platform 308, status monitoring component 402, workload management component 404, provisioning component 406, data store 408, communication component 502, workload execution component 504, feedback and alert reporting component 506, tracking component 508, AI component 602, etc.) disclosed herein with respect to systems 100-600 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of universal serial bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
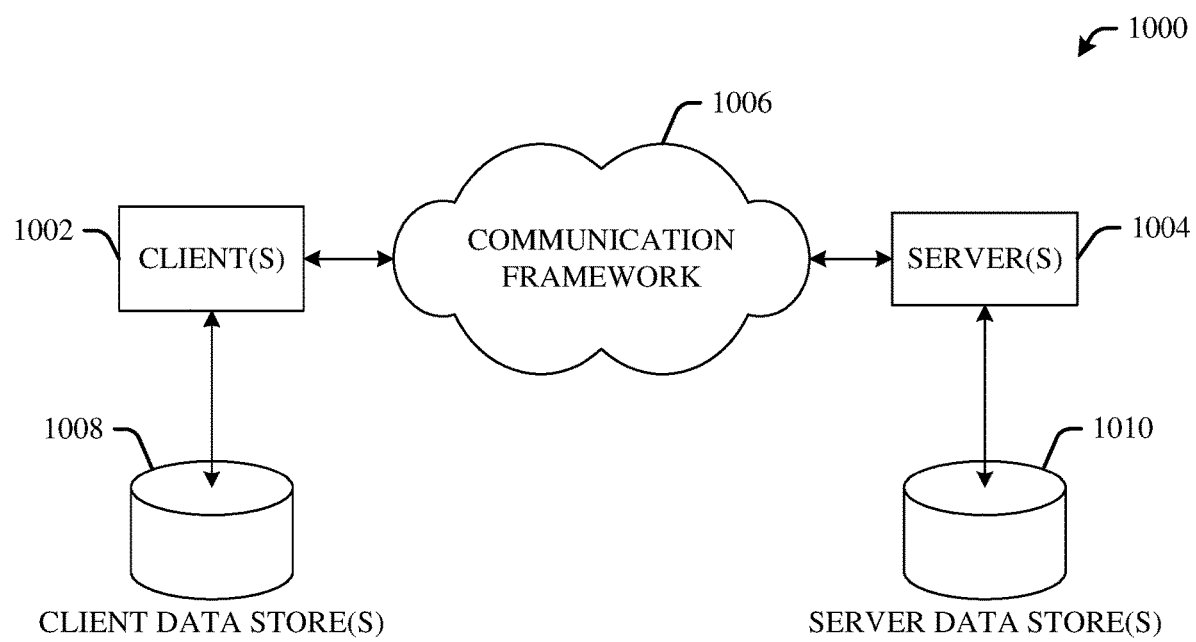
FIG. 10 illustrates a schematic block diagram of a computing environment in accordance with the subject specification.

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
based on provisioning data associated with a global Internet of things service related to a mobile Internet of things device, assigning workloads to collaborative edge gateway devices that are deployed globally, wherein the collaborative edge gateway devices comprise a first edge gateway device and a second edge gateway device;
receiving state data associated with a workload, of the workloads, that is initially assigned to the first edge gateway device, wherein the state data comprises external state data that indicates a defined condition is associated with a first route of a shipment initially being routed towards the first edge gateway device, and wherein the shipment is associated with the mobile Internet of things device;
based on an analysis of the external state data that indicates the defined condition is associated with the first route of the shipment, predicting that the shipment will be rerouted from the first route to a second route associated with the second edge gateway device due in part to the defined condition; and
in response to determining that the state data satisfies an unexpected state criterion based on the predicting, modifying the workloads assigned to the collaborative edge gateway devices, wherein the modifying comprises terminating assignment of the workload to the first edge gateway device and reassigning the workload to the second edge gateway device.

2. The system of claim 1, wherein the state data comprises the external state data relating to the defined condition, comprising a weather condition or a traffic condition, associated with the shipment initially being routed towards the first edge gateway device,
wherein the predicting comprises: based on the analysis of the external state data, predicting the shipment will be rerouted from the first route associated with the first edge gateway device to the second route associated with the second gateway device due in part to the weather condition or the traffic condition, and
wherein the modifying comprises the terminating of the assignment of the workload to the first edge gateway device and the reassigning of the workload to the second edge gateway device, based on the predicting that the shipment will be rerouted from the first route to the second route.

3. The system of claim 1, wherein the provisioning data comprises route data indicative of a route via which the mobile Internet of things device is predicted to travel, and wherein the route comprises the first route.

4. The system of claim 3, wherein the operations further comprise selecting the collaborative edge gateway devices based on the route data.

5. The system of claim 1, wherein the modifying comprises modifying the workloads based on the analysis of the external state data received from a network server.

6. The system of claim 1, wherein the collaborative edge gateway devices form a structured mesh network to transfer tracking data that is employable to monitor quality of service associated with the global Internet of things service.

7. The system of claim 6, wherein the transfer employs a blockchain-based technology.

8. The system of claim 1, wherein the modifying comprises modifying the workloads based on a service level agreement associated with the global Internet of things service.

9. The system of claim 1, wherein the second edge gateway device executes the workload based on measurement data received from the mobile Internet of things device.

10. The system of claim 1, wherein an execution of the workload comprises a transmission of instruction data to an authorized user device.

11. The system of claim 1, wherein the receiving the state data comprises receiving the state data via a collaborative application programming interface.

12. A method, comprising:
receiving, by a system comprising a processor, provisioning data associated with a global Internet of things service related to a mobile Internet of things device;
based on the provisioning data, determining, by the system, parameter data that defines an expected quality of service associated with the mobile Internet of things device;
based on the parameter data, scheduling, by the system, workloads at collaborative edge gateway devices that are deployed across respective countries, wherein the collaborative edge gateway devices comprise a first edge gateway device and a second edge gateway device;
receiving, by the system, state data associated with a workload, of the workloads, that is initially assigned to the first edge gateway device, wherein the state data is indicative of a state of the workload, wherein the state data comprises external state data that indicates a defined condition is associated with a first route on which a package is being shipped, wherein the first route is associated with the first edge gateway device, and wherein the package is associated with the mobile Internet of things device;
based on an analysis of the external state data that indicates the defined condition is associated with the first route, predicting, by the system, that the package will be rerouted from the first route to a second route associated with the second edge gateway device, in response to the defined condition; and
in response to determining that the state data, associated with the first edge gateway device, satisfies an unexpected state criterion based on the predicting, updating, by the system, the workloads, wherein the updating comprises reassigning the workload from the first edge gateway device to the second edge gateway device.

13. The method of claim 12, further comprising:
based on the provisioning data, determining, by the system, route data indicative of a route via which the mobile Internet of things device is expected to travel, wherein the route comprises the first route.

14. The method of claim 13, further comprising:
based on the route data, selecting, by the system, the first edge gateway device of the collaborative edge gateway devices.

15. The method of claim 12, wherein the updating comprises updating the workloads based on the analysis of the external data received from a network server.

16. The method of claim 12, the updating comprises updating the workloads based on machine learning.

17. The method of claim 12, the updating comprises updating the workloads based on a result of big data analytics performed via the workloads.

18. A non-transitory machine-readable medium, comprising executable instructions that, when executed by a processor of a control plane device, facilitate performance of operations, comprising:
determining provisioning data associated with a global Internet of things service related to a mobile Internet of things device;
based on the provisioning data, determining parameter data that defines an expected quality of service associated with the mobile Internet of things device;
based on the parameter data, configuring workloads across collaborative edge gateway devices that are deployed in different countries, wherein the collaborative edge gateway devices comprise a first edge gateway device and a second edge gateway device, and wherein the workloads comprise a workload;
receiving state data associated with the workload that is initially assigned to the first edge gateway device, wherein the state data comprises external state data that indicates a particular condition is associated with a first path on which a package is to be transported, wherein the first path is associated with the first edge gateway device, and wherein the package is associated with the mobile Internet of things device;
based on an analysis of the external state data that indicates the particular condition is associated with the first path, determining that the package will be rerouted from the first path to a second path associated with the second edge gateway device due in part to the defined condition; and
in response to determining that the state data satisfies an unexpected state criterion based on the determining that the package will be rerouted, reconfiguring the workloads, wherein the reconfiguring comprises reassigning the workload from the first edge gateway device to the second edge gateway device.

19. The non-transitory machine-readable medium of claim 18, wherein the operations further comprise:
based on the provisioning data, determining path data indicative of a path via which the mobile Internet of things device is expected to travel, wherein the path comprises the first path.

20. The non-transitory machine-readable medium of claim 19, wherein the operations further comprise selecting the collaborative edge gateway devices based on the path data.

* * * * *